United States Patent
Guerineau et al.

(10) Patent No.: US 10,677,650 B2
(45) Date of Patent: Jun. 9, 2020

(54) FOURIER TRANSFORM MULTI-CHANNEL SPECTRAL IMAGER

(71) Applicants: OFFICE NATIONAL D'ETUDES ET DE RECHERCHES AEROSPATIALES, Palaiseau (FR); UNIVERSITE GRENOBLE ALPES, Saint-Martin-d'Heres (FR)

(72) Inventors: Nicolas Guerineau, Antony (FR); Etienne Le Coarer, Grenoble (FR); Yann Ferrec, Bourg la Reine (FR); Florence De La Barriere, Clichy-sous-Bois (FR)

(73) Assignees: OFFICE NATIONAL D'ETUDES ET DE RECHERCHES AEROSPATIALES, Palaiseau (FR); UNIVERSITE GRENOBLE ALPES, Saint-Martin-d'Heres (FR)

( * ) Notice: Subject to any disclaimer, the term of this patent is extended or adjusted under 35 U.S.C. 154(b) by 0 days.

(21) Appl. No.: 16/313,721

(22) PCT Filed: Jun. 30, 2017

(86) PCT No.: PCT/FR2017/051777
§ 371 (c)(1),
(2) Date: Dec. 27, 2018

(87) PCT Pub. No.: WO2018/002558
PCT Pub. Date: Jan. 4, 2018

(65) Prior Publication Data
US 2019/0170576 A1   Jun. 6, 2019

(30) Foreign Application Priority Data
Jun. 30, 2016   (FR) .................................... 16 56162

(51) Int. Cl.
*G01B 9/02* (2006.01)
*G01J 3/02* (2006.01)
(Continued)

(52) U.S. Cl.
CPC ........... *G01J 3/0208* (2013.01); *G01J 3/0205* (2013.01); *G01J 3/0256* (2013.01); *G01J 3/0297* (2013.01);
(Continued)

(58) Field of Classification Search
CPC ...... G01J 3/0208; G01J 3/0205; G01J 3/0297; G01J 3/26; G01J 3/2803; G01J 3/2823;
(Continued)

(56) References Cited

U.S. PATENT DOCUMENTS 5,835,517 A * 11/1998 Jayaraman ......... G02B 6/29358
372/50.124
6,016,199 A   1/2000 Newton
(Continued)

FOREIGN PATENT DOCUMENTS

WO   WO 2015/015493 A2   2/2015

OTHER PUBLICATIONS

International Search Report dated Oct. 4, 2017, in PCT/FR2017/051777, filed Jun. 30, 2017.
(Continued)

*Primary Examiner* — Tarifur R Chowdhury
*Assistant Examiner* — Jonathon Cook
(74) *Attorney, Agent, or Firm* — Oblon, McClelland, Maier & Neustadt, L.L.P.

(57) ABSTRACT

A spectral imager, including: a photodetector including a plurality of photosensitive sites exposed on a photosensitive surface; a collimating lens including an intermediate focal plane; an array of interferometers including two main waves, each including a cavity defined by two faces; an array of
(Continued)

microlenses arranged in a plane parallel to the photosensitive surface, each microlens paired with an interferometer to form an optical pair, including an image focal plane coinciding with the photosensitive surface and facing a section of the photosensitive surface.

13 Claims, 4 Drawing Sheets (51) Int. Cl.
  *G01J 3/26* (2006.01)
  *G01J 3/28* (2006.01)
  *G01J 3/453* (2006.01)

(52) U.S. Cl.
  CPC ............... *G01J 3/26* (2013.01); *G01J 3/2803* (2013.01); *G01J 3/2823* (2013.01); *G01J 3/4531* (2013.01)

(58) Field of Classification Search
  CPC ...... G01J 3/4531; G01J 3/0256; G01J 3/0259; G01J 2003/2826; G01B 9/02044
  USPC .................................................. 356/454, 456
  See application file for complete search history.

(56) References Cited

U.S. PATENT DOCUMENTS

| | | | |
|---|---|---|---|
| 2004/0239939 A1* | 12/2004 | Guerineau | G01J 3/0259 356/454 |
| 2012/0200852 A1* | 8/2012 | Tejada | G01J 3/12 356/326 |
| 2012/0268745 A1 | 10/2012 | Kudenov | |
| 2013/0130428 A1* | 5/2013 | TeKolste | G01J 3/18 438/70 |
| 2015/0233762 A1 | 8/2015 | Goldring et al. | |
| 2015/0292948 A1 | 10/2015 | Goldring et al. | |
| 2015/0300879 A1 | 10/2015 | Goldring et al. | |
| 2015/0355024 A1 | 12/2015 | Goldring et al. | |
| 2016/0238449 A1 | 8/2016 | Goldring et al. | |
| 2017/0234729 A1 | 8/2017 | Goldring et al. | |
| 2019/0025122 A1* | 1/2019 | Nayak | G01V 8/02 |

OTHER PUBLICATIONS

Preliminary French Search Report dated Apr. 25, 2017, in FR 1656162, filed Jun. 30, 2016.

Born, M. et al., "Principles of Optics Section VII (Elements of the theory of interferences and interferometers)", 1980, pp. 206-369.

Fortunato, G. "Application de la correlation interferentielle de spectres a la detection de polluants atmospheriques", J. Optics (Pars), vol. 9, No. 5, 1978, pp. 281-290, with English abstract.

Diard, T. et al., "Compact high-resolution micro-spectrometer on chip: spectral calibration and first spectrum", Proceedings of International Society for Optical Engineering, vol. 9836, XP 060071328, May 25, 2016, 7 pages.

Ferrec, Y. et al., "Current status and perspectives for Microspoc, the miniature Fourier transform spectrometer", Fourier Transform Spectroscopy and Hyperspectral Imaging and Sounding of the Environment, XP 055366858, Jan. 1, 2015, 3 pages.

Shogenji, R. et al., "Multispectral imaging using compact compound optics", Optics Express, vol. 12, No. 8, Apr. 19, 2004, pp. 1643-1655.

\* cited by examiner

FOURIER TRANSFORM MULTI-CHANNEL SPECTRAL IMAGER

TECHNICAL DOMAIN

This invention relates to a Fourier transform multi-channel spectral imager designed to simultaneously take images of a given plurality of interference states of a scene. More particularly, the invention relates to a compact device designed to simultaneously produce images of a scene, and at different wavelengths. Such a device is called a spectral imager.

TECHNICAL DOMAIN AND PRIOR ART

Figure 1:
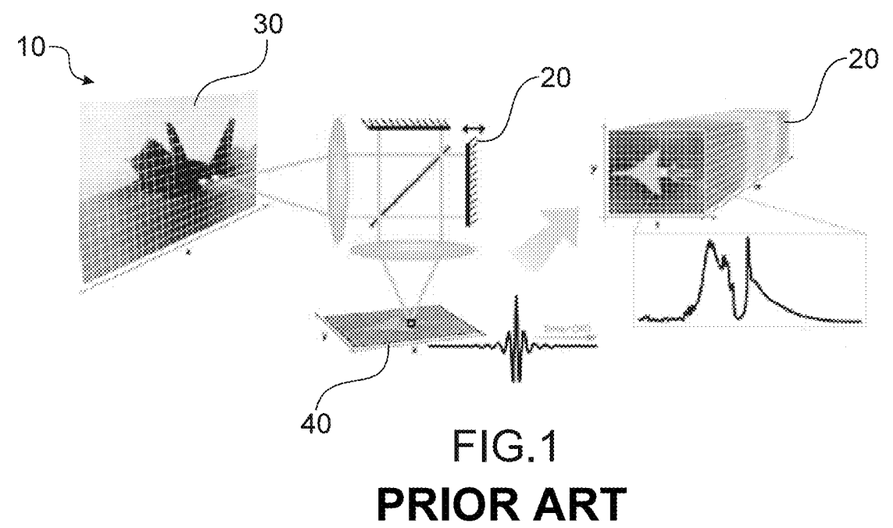
FIG. 1 is a diagrammatic representation of a Fourier transform spectral imager comprising a Michelson interferometer known in prior art, the device is adapted to image the interference state of a scene, for each position of the mirror, la

A Fourier transform spectral imager 10 presented in FIG. 1 and known in prior art comprises a two-wave interferometer. This spectral imager, now marketed by the TELOPS company under the name "Hyper-Cam™", comprises a Michelson interferometer and a photodetector 40.

The photodetector 40 comprises a plurality of photosensitive sites ("Pixels") that will be used to image a scene 30.

Therefore, for different positions of the mobile mirror 30 of the Michelson interferometer, each photosensitive site of the photodetector 40, in correspondence with a given point in the scene 30, collects a light intensity representative of a state of interference of said point. All light intensities thus collected by all photosensitive sites for a position of the mobile mirror 30, correspond to an interference state of the scene 30, that we call "interferometric image".

During operation, such a device collects a plurality of interferometric images for different positions of the mobile mirror 30, such that for each photosensitive site, all interference states collected by said site correspond to an interferogram coding the Fourier transform of the spectrum (or spectral light intensity) of a point on the scene 30. A mathematical "Fourier transform" type processing of all interferometric images can then be applied to obtain a set of images in the scene 30 at different wavelengths that we call "spectral images" (the complete set of spectral images forms an "image cube").

However, this device is not satisfactory.

The formation of a spectral image of a scene in the plane of the photodetector 40 requires acquisition of an interferometric images sequence for different positions of the mobile mirror 20. Consequent, the acquisition of moving scenes with sufficient resolution is difficult if not impossible.

Furthermore, such devices require a fine alignment of their optical components and are thus complex to use.

Furthermore, fine realignments may be required whenever temperature and pressure variations are observed.

Finally, due to its mass and dimensions, only the detector is cooled and thus requires regular realignments.

Figure 2:
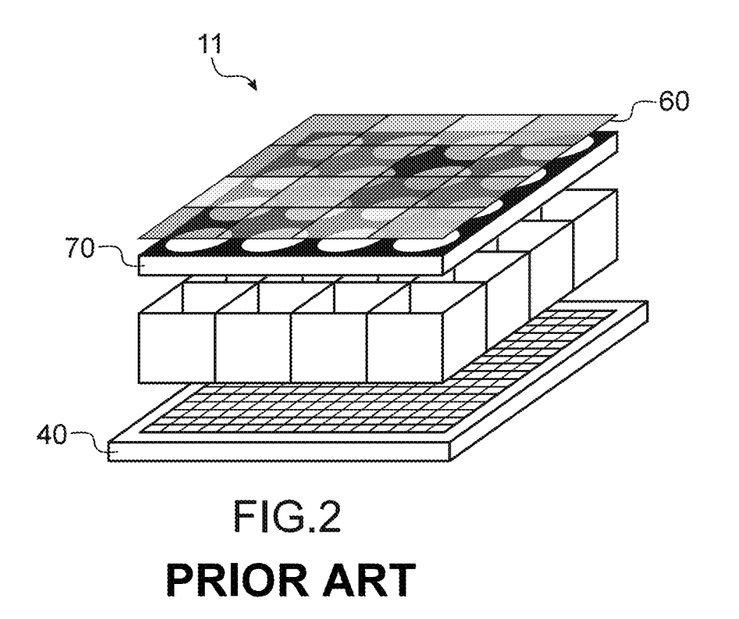
FIG. 2 is a diagrammatic representation of a spectral imager known in prior art, the spectral imager comprises a network of microlenses arranged facing a photosensitive detector, each microlens having a colour filter upstream on the optical path, such that the image projected by each lens on the section of the photosensitive sensor that is facing it is essentially monochromatic.

FIG. 2 presents another spectral imager 11 known in prior art and disclosed in document [1] and mentioned at the end of the description.

In document [1], the spectral imager comprises a network of microlenses 70 arranged facing a photosensitive sensor (image sensor). The spectral imager also comprises a network of coloured filters 60 placed between the microlenses network and the photosensitive sensor.

The layout, shape and size of the microlenses and coloured filters can be used to constitute essentially monochromatic images of a single scene on different sections of the photosensitive sensor (each filter filters the image of the scene at a specific wavelength before transmitting it to the photosensitive sensor).

Unlike the spectral imager presented in FIG. 1, there is no mobile part and acquisition of the scene takes place simultaneously for all representative wavelengths of filters of the coloured filters network. We qualify this device as multi-channel (Each coloured filter corresponding to one channel). This device forms spectral images on the photodetector directly without using an inverse Fourier transform calculation (the image cube is obtained directly on the surface of the photodetector).

This device is also unsatisfactory.

The spectral resolution of such a device is essentially dependent on the number of filters 60 and the spectral width of each filter. Thus, the increase in the spectral resolution makes it necessary to increase the number of filters and to reduce the spectral width of each filter, which correspondingly very much reduces the size of said filters and consequently also reduces the light flux passing through each filter 60. Thus, the sensitivity of the device decreases as the number of filters increases.

Furthermore, if the number of coloured filters 60 increases, the image becomes blurred and the contrast is low.

Moreover, the device presented in FIG. 2 cannot be used to observe dark scenes.

One purpose of this invention is to disclose a multi-channel spectral imager capable of simultaneously acquiring several monochromatic images of the same scene with better spectral resolution and sensitivity than are possible with prior art.

Another purpose of the invention is to disclose a more compact spectral imager than spectral imagers available in prior art, so that they can be completely cooled to low temperature.

PRESENTATION OF THE INVENTION

The purposes of the invention are at least partly achieved by a Fourier transform multichannel spectral imager, the device comprising:
  a photodetector comprising a plurality of photosensitive sites flush with a photosensitive surface of said photodetector,
  a network of two majority wave interferometers, each comprising a cavity delimited by two faces facing each other and parallel to the photosensitive surface, the two faces of each interferometer being at a different spacing h from one interferometer to the next, the interferometers being arranged in a plane parallel to the photosensitive surface,
  a network of microlenses formed in a plane parallel to the photosensitive surface.

Each microlens in the network of microlenses being paired with an interferometer in the interferometers network to form an optical pair, said optical pair comprising a focal image plane coincident with the photosensitive surface, said pair facing a section of the photosensitive surface.

Thus, each optical pair is arranged so as to form an interferometric image (on other words to image an interference state, for a given step difference) on the section of the photosensitive surface facing it.

The spectral imager according to the invention can be used to simultaneously collect a plurality of interferometric images.

Furthermore, the spectral imager according to the invention is also adapted for observation of moving scenes.

Furthermore, the spectral imager according to the invention has better sensitivity than the spectral imager presented FIG. 2. The spectral images are composed from the set of interferometric images, in other words, unlike the device in prior art, the entire light flux reaching the photosensitive surface is considered for construction of the spectral images. It is thus possible to envisage a spectral imager with high spectral resolution without degrading the sensitivity of said spectral imager.

Finally, unlike the device presented in FIG. 2, the spectral imager according to the invention is more flexible in terms of the wavelengths covered. Wavelengths tested by the device in FIG. 2 are fixed at the design stage of said device.

The spectral imager may also comprise a collimating lens comprising an intermediate focal plane, placed parallel to the photosensitive surface. The collimating lens may have a curved surface. The curved surface of the collimating lens can be treated with an anti-reflection deposit, the anti-reflection treatment advantageously being a layer of dielectric material, advantageously ZnS.

According to one embodiment, the spectral imager also comprises a signal separation network, each signal separator being paired with an optical pair and arranged such that an image formed by each optical pair at the photosensitive surface is limited to the section of the photosensitive surface facing which said optical pair is positioned.

According to one embodiment, each signal separator comprises side walls perpendicular to the photosensitive surface, and advantageously bearing in contact with said photosensitive surface.

According to one embodiment, each signal separator comprises second side walls, each of the second side walls optically isolating two adjacent two majority wave interferometers.

According to one embodiment, the spectral imager comprises a first sub-slide, the first sub-slide comprises a first face and a second face parallel to the first face, the second face being parallel to and facing a first face of a second sub-slide, the second sub-slide also comprising a second face on which the network of microlenses is located, the device also comprising steps formed on one of the two faces chosen from among the second face of the first sub-slide and the first face of the second sub-slide, the other of the two faces being a plane diopter, such that the steps formed on one of the two faces form the network of two majority wave interferometers with the plane diopter, each step being formed at a different depth from the other steps, and being vertically in line with a microlens along a direction perpendicular to the photosensitive surface.

According to one embodiment, the second face of the first sub-slide has a reflection factor equal to between 5% and 90%.

According to one embodiment, the first face of the second sub-slide has a reflection factor equal to between 5% and 90%.

According to one embodiment, the steps are square, rectangular or hexagonal in shape.

According to one embodiment, interferometers in the network of two majority wave interferometers are distributed in a two-dimensional matrix, advantageously a square two-dimensional square matrix.

According to one embodiment, the photodetector, the network of two majority wave interferometers and the microlenses network are all located in a cryostatic chamber, and advantageously the cryostatic chamber comprises an aperture.

According to one embodiment, each of the microlenses has a curved surface, said surfaces being treated with an anti-reflection deposit, the anti-reflection treatment advantageously being a layer of dielectric material, advantageously ZnS.

According to one embodiment, the interferometers in the network of two majority wave interferometers have an average coefficient of reflection equal to between 12% and 60%, advantageously between 20% and 50%, preferably equal to 42%.

The invention also relates to use of the spectral imager according to this invention for the detection and/or quantification of gases and/or aerosols.

According to one embodiment, the gases are greenhouse gases, and particularly carbon dioxide; water or methane.

The invention also relates to a mobile electronic device comprising a spectral imager according to this invention, the mobile electronic device advantageously being a mobile telephone or a tablet or a drone.

BRIEF DESCRIPTION OF THE DRAWINGS

Other characteristics and advantages will become clear in the following description of methods of manufacturing a Fourier transform multichannel spectral imager according to the invention, given as non-limitative examples, with reference to the appended drawings in which.

DETAILED PRESENTATION OF PARTICULAR EMBODIMENTS

The invention described in detail below uses a network of two majority wave interferometers 140 located in an optical device comprising a network of microlenses. Each microlens is paired with an interferometer to form an optical pair 160. The optical pair 160 is arranged to project the state of interference of the scene on a section of a photosensitive sensor, for a given step difference. Such a device can be used for the acquisition of a plurality of interferometric images simultaneously, without the use of mobile parts.

The optical device can also include a collimating lens 110, that will send the image of an object located in its object focal plane (hereinafter called the intermediate focal plane) to infinity.

FIGS. 3a to 3d show an example of the fabrication of the interferometric device with two majority waves 100 according to the invention.

The Fourier transform multi-channel spectral imager 100 comprises a photodetector 120 (FIG. 4) comprising a plurality of photosensitive sites ("Pixels") flush with a photosensitive surface 121 of said photodetector 120. The direction perpendicular to the photosensitive surface 121 is referred to as the Y direction in the following.

Figure 4:
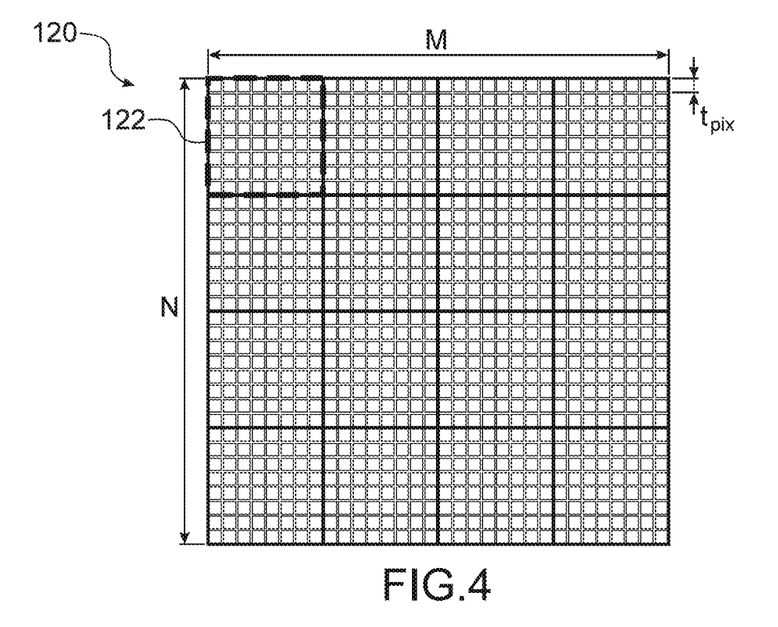
FIG. 4 is a diagrammatic representation of a photodetector represented by a matrix of photosensitive sites arranged in M columns and N rows.

A photosensitive site refers to a site adapted to count a number of incident photos on its surface and to transform said number of photons into an electrical circuit, for example a voltage and/or a current. The photosensitive sites can be arranged in a matrix comprising M columns and N rows (therefore there are M×N photosensitive sites). Furthermore, the size of the photosensitive sites is denoted $t_{pix}$.

The photodetector 120 can include a CMOS image sensor, a CCD (Charge Coupled Device) image sensor.

The photosensitive sites of the photodetector 120 can advantageously be arranged regularly (periodically) on a plane surface.

Figure 3A:
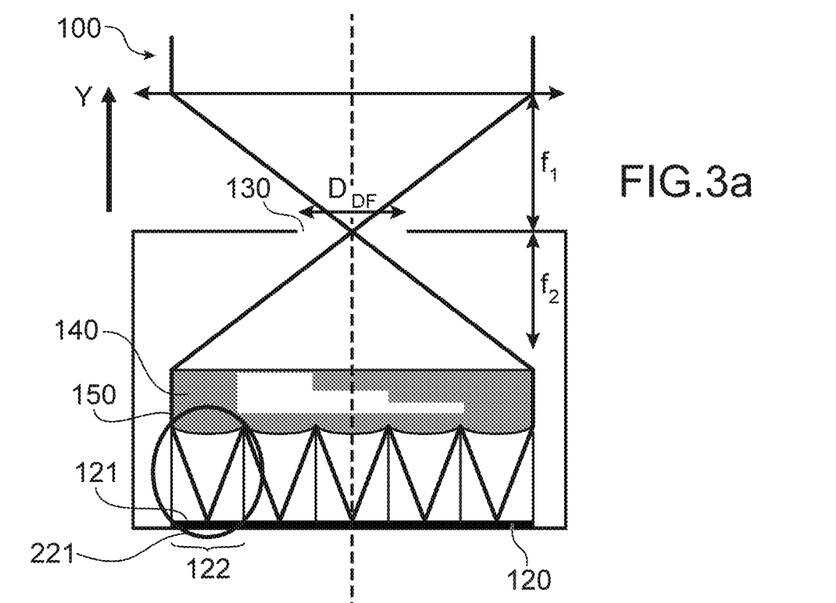
FIGS. 3a to 3d are diagrammatic representations of a spectral imager according to one particular embodiment of the invention (FIG. 3b being identical to FIG. 3a to avoid overloading the diagram with references), FIG. 3c representing the arrangement of the first and second sub-slides, and FIG. 3d giving details of an interferometer with two majority waves.
Figure 3B:
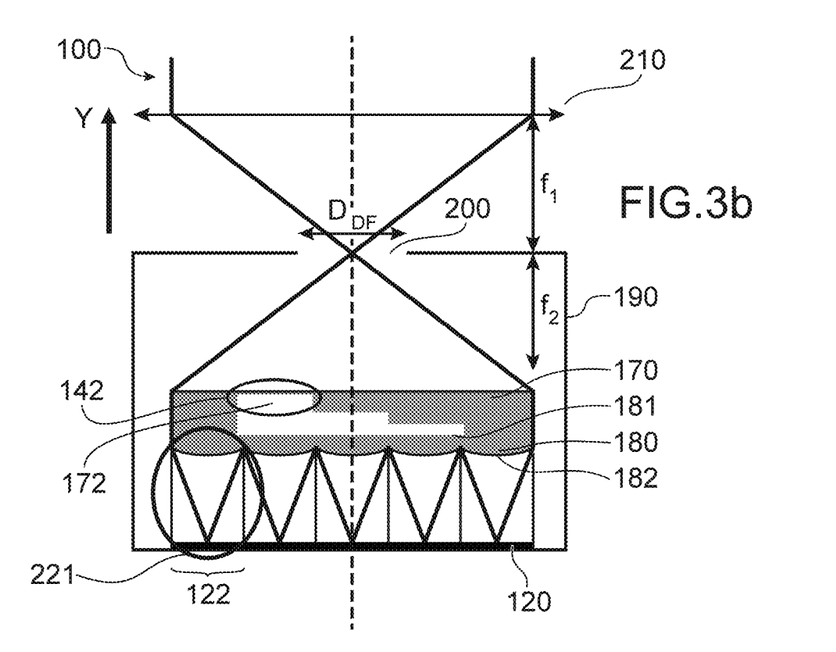
Figure 3C:
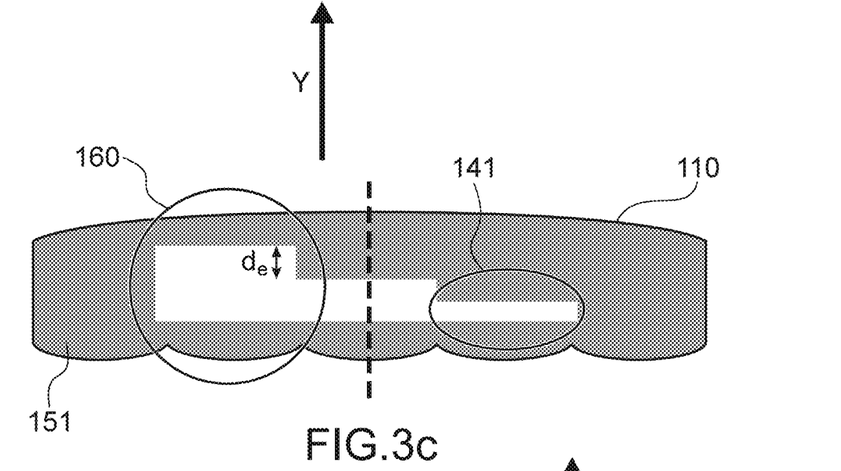
Figure 3D:
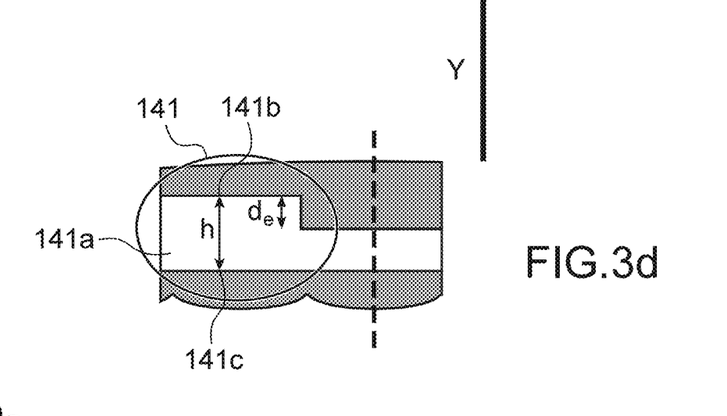

The interferometric device with two majority waves 100 can also include a collimating lens 110 (FIG. 3c). The axis of the collimating lens 110 is parallel to the Y direction (therefore the collimating lens 110 is parallel to the photosensitive surface 121). Throughout the presentation, the terms collimating lens and diopter are used interchangeably (according to the invention, they can also be reduced to optical collimation means). The axis of a lens is the axis connecting the image and primary focal points of a collimating lens 110. The collimating lens 110 comprises an intermediate focal plane 130. The intermediate focal plane 130 is defined as being a plane perpendicular to the axis of the collimating lens 110 passing through the primary focal point of said collimating lens 110. The collimating lens 110 is a lens with diameter Φ2 and focal distance f2.

The device 100 according to the invention comprises a network of two majority wave interferometers 140. Each interferometer 141 with two majority waves comprises a cavity 141a delimited by two faces 141b, 141c facing each other and parallel to each other, and at a spacing h along a direction perpendicular to the photosensitive surface 121. The interferometers are arranged in a plane parallel to the photosensitive surface 121.

The cavity 141a may be an air cavity, or it may be filled with a solid material, for example germanium.

Figure 3E:
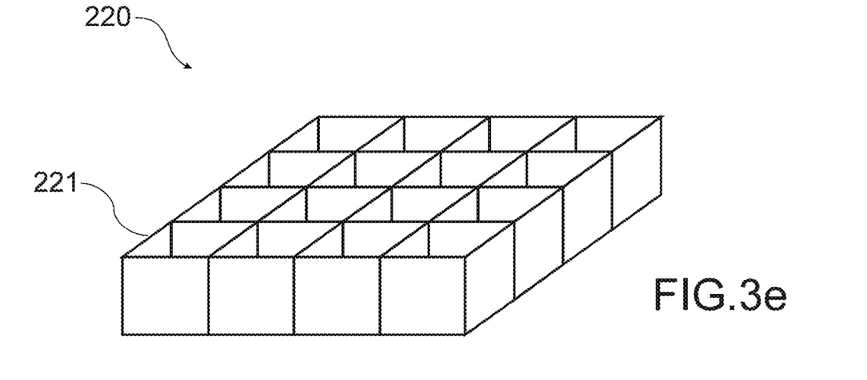
FIG. 3e is a diagrammatic representation of a signal separator.

A network of interferometers means a two-dimensional matrix of interferometers 141 arranged side by side in a plane, and different from each other. Different from each other means that the spacing h is different from one interferometer 141 with two majority waves to the next. Consequently, the network of two majority wave interferometers 140 is characterised by a set of different spacings h, each imposing a different step difference (FIG. 3e).

Alternatively, a different step difference between each interferometer can also be imposed by a different refraction index in the cavity formed by each interferometer. In other words, the cavities of each interferometer can be filled with material with a different index such that each interferometer is associated with a step difference different from the other interferometers.

For the purposes of this invention, interferometer 141 with two majority waves means an air cavity 141a delimited by two parallel faces 141b, 141c (also parallel to the photosensitive surface 121). The two parallel faces 141b, 141c have an average reflection coefficient R equal to less than 60%, preferably less than 50%, and even more preferably less than 45%. The average reflection coefficient is defined by the relation $R=\sqrt{R_1 R_2}$, in which $R_1$ and $R_2$ are the internal reflection coefficients of the two faces 141b, 141c respectively delimiting the air cavity 141a of an interferometer 141 with two majority waves according to the invention.

The interferometer 141 with two majority waves according to the invention can also be characterised by its fineness F that is defined by the following relation:

$$F = \frac{\pi\sqrt{R}}{(1-R)}$$

For a fineness F=10, the average reflection coefficient R is equal to 72%.

A high average reflection coefficient, for example more than 70%, is characteristic of an interference filter (in other words a multiple wave interferometer). Such a device is very difficult to fabricate and to manipulate, and is not well adapted to large quantity industrial production. Furthermore, such a device is very sensitive to its external environment (dust, humidity, etc.).

According to this invention, an interferometer with two majority waves is an interferometer for which the fineness F is between 2 and 10, advantageously between 2 and 5, for example 4.

Figure 5:
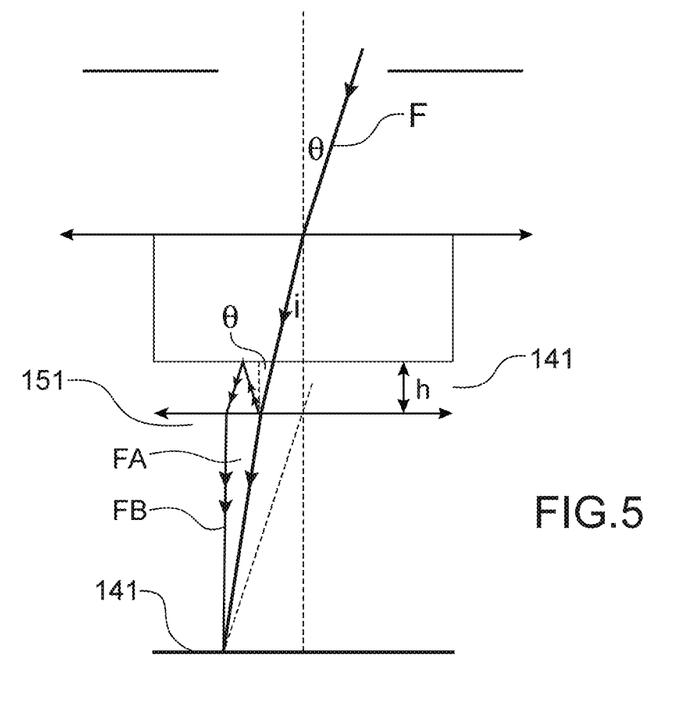
FIG. 5 is a diagrammatic representation of transmission of light radiation by an interferometer with two majority waves.

FIG. 5 illustrates the operating principle of an interferometer 141 with two majority waves according to the invention. In the example illustrated in FIG. 5, the interferometer 141 is illuminated by radiation F. A first beam FA is transmitted without reflection and a second beam FB is transmitted after reflection on each of the faces 141b, 141c of the interferometer 141 with a phase shift Δφ imposed by the spacing h between the two faces 141b, 141c of the interferometer 141 with two majority waves. The two beams are superposed to form an interference volume. When a detection plane is placed inside this interference volume, an interference figure can be observed. An expert in the subject can find a detailed description of interferometers 141 with two majority waves in the book [2] cited at the end of the detailed description.

The device according to the invention also includes a microlenses network 150. The microlenses 151 are arranged in a plane parallel to the photosensitive surface 121.

Microlenses network 150 means a two-dimensional matrix of microlenses 151 arranged side-by-side in a plane. Each microlens 151 has an F number or aperture ratio number denoted $N_{ouv}$.

Each microlens 151 in the microlenses network 150 is paired with an interferometer 141 of the interferometers network 140 to form an optical pair 160.

Paired means that each microlens 151 is made to correspond to an interferometer 141 along a direction perpendicular to the photosensitive surface 121. In other words, each microlens 151 is superposed along the direction perpendicular to the photosensitive surface 121, with an interferometer 141 in the interferometers network 140. Therefore we understand that each optical pair 160 corresponds to a stack of a microlens 151 and an interferometer 141 with two majority waves along the Y direction. After reading the detailed description of particular embodiments of the invention, an expert in the subject will understand that the microlenses network 150 and the network of two majority wave interferometers 140 therefore forms a network of optical pairs 160.

Therefore each optical pair 160 comprises a focal image plane coincident with the photosensitive surface 121. Considering a collimating lens 110, each optical pair 160 is thus located relative to the collimating lens 110 and the photosensitive surface 121 such that a scene located in the intermediate focal plane 130 is projected by each pair onto a section 122 of the photosensitive surface 121. We will also understand that for each optical pair 160, there is a corresponding section 122 of the photosensitive surface 121 such that the set of sections 122 of photosensitive surface 121 forms a network of sections of the photosensitive surface 121. A section 122 of surface will also be called "channel".

The number of surface sections 122 is also called "number of channels" and is denoted $N_{channels}$. Each channel can include sensitive sites of the photodetector 120 arranged in μ columns and v rows (therefore there are μ×v photosensitive sites per channel).

According to the invention, each of the image channels simultaneously has an interference state (for a given step difference and imposed by the spacing h of the interferometer with two majority waves associated with it). Otherwise, all images collected at the different channels. Consideration of the network of optical pairs 160 makes it possible to simultaneously acquire the same number of interferometric images as the number of optical pairs 160. Thus, according to the invention, a cube of monochromatic images (or spectral images) can thus be reconstituted by processing of data thus obtained by an inverse Fourier transform.

Thus, the acquisition of spectral images is instantaneous (all data necessary for the creation of spectral images are obtained simultaneously).

Furthermore, the device according to the invention does not contain any mobile parts.

Advantageously, each section 122 of the photosensitive surface 121 comprises the same number of photosensitive sites. Thus, processing of data collected during the observation of a scene is facilitated. Still advantageously, all sections 122 of the photosensitive surface 121 have the same shape and the same dimensions.

The spacing h of the set of spacings in the network of two majority wave interferometers 140 can be uniformly distributed between a minimum spacing $h_{min}$ and a maximum spacing $h_{max}$. Note that the spectral resolution improves with increasing values of the maximum spacing $h_{max}$.

We will now describe an application of the invention illustrated in FIGS. 3a to 3d.

In this example, the device is provided with the collimating lens 110. It is understood that this collimating lens can be omitted.

According to this application, the collimating lens 110 comprises an intermediate focal plane 130. The collimating lens 110 is arranged parallel to the photosensitive surface 121. Furthermore, the collimating lens 110 is arranged such that radiation passing through the intermediate focal plane 130 is sent to infinity in the direction of the photosensitive surface 121. According to this first application, the collimating lens 110 comprises a convex diopter (the terms convex and convex diopter are used interchangeably in the text) formed on a first face 171 of a first sub-slide 170.

If the collimating lens 110 is omitted, the first face 171 of the first sub-slide 170 may be a plane diopter.

The first sub-slide 170 also comprises a second face 172. The interferometric device with two majority waves also comprises a second sub-slide 180. The second sub-slide 180 comprises a first face 181 and a second face 182 parallel to each other.

The first sub-slide 170 and the second sub-slide 180 can be parallel to the photosensitive surface 121.

The second face 172 of the first sub-slide 170 is facing the first face 181 of the second sub-slide 180.

A sub-slide relates to a thin slide with parallel faces connected by a contour.

The second sub-slide 180 also comprises a second face 182 on which the network of microlenses 150 is located. Steps 142 are formed on one of the two faces chosen from among the second face 172 of the first sub-slide 170 and the first face 181 of the second sub-slide 180, the other of the two faces being a plane diopter, such that the steps 142 formed on one of the two faces cooperates with the plane diopter to form the network of two majority wave interferometers 140. Each step 142 is formed at a different depth from the other steps 142, and is vertically in line with a microlens 151 along a direction perpendicular to the photosensitive surface 121. In the example illustrated in FIGS. 3a to 3d, the steps 142 are formed on the second face 172 of the first sub-slide 170, however it could be envisaged to form steps 142 on the first face 181 of the second sub-slide 180.

The technique for formation of steps 142 is based on general knowledge of an expert in the subject and therefore is not described in this invention.

The distance between two adjacent steps 142 is denoted $d_e$. In other words $d_e$ is the difference between the spacings h of two adjacent steps 142. Advantageously, $d_e$ may be constant over the entire area over which the steps 142 extend.

Advantageously, the reflection coefficient of the second face 172 of the first sub-slide 170 may be between 5% and 90%.

Also advantageously, the reflection coefficient of the first face 181 of the second sub-slide 180 may be between 5% and 90%.

Particularly advantageously, the reflection coefficients of the second face 172 and the first face 181 are equal. Thus, the spectral imager has a better contrast.

The steps 142 may be square, rectangular, or hexagonal in shape.

Advantageously, the network of two majority wave interferometers 140 may be a two-dimensional square matrix, or a two-dimensional rectangular matrix.

Particularly advantageously, the spectral imager 100 also comprises a signal separation network 220, each signal separator 221 being paired with an optical pair 160 and arranged such that an image formed by each optical pair 160 at the photosensitive surface 121 is limited to the section 122 of the photosensitive surface 121 facing which said optical pair 160 is positioned.

Thus, the image formed by one optical pair does not extend over a section 122 associated with another optical pair.

Each signal separator 221 may comprise first side walls perpendicular to the photosensitive surface, and advantageously bearing in contact with said photosensitive surface. In other words, the signal separators form a grid on the photosensitive surface 121, and physically separate each channel such that each of said channels only collects the optical signal output from the optical pair with which it is paired.

Each signal separator 221 can also comprise second side walls, each of the second side walls optically isolating two adjacent two majority wave interferometers.

"Optically insulating" means opaque walls in the working range of wavelengths of the spectral imager.

Also advantageously, the photodetector 120, the collimating lens 110 (if it must be considered), the network of two majority wave interferometers 140, and the network of microlenses 150 may all be located in a cryostatic chamber 190. The compactness of the device makes it possible to consider cooling the device in its entirety.

Advantageously, the cryostatic chamber 190 may comprise an aperture 200 at the cold screen of said chamber 190. In other words, the cold screen and its aperture 200 form a diaphragm limiting the field, for example the diameter of the aperture 200 is $\Phi_{DF}$. More particularly, the aperture 200 is coincident with the intermediate focal plane 130. The cryostatic chamber 190 may for example be a cryostat, more particularly the cryostat is of the Scorpio™ or Daphnis™ type marketed by the SOFRADIR company.

Note that the use of a cryostatic chamber 190 is not limited to only this first application, and that it can be generalised to all variants of this invention.

The device may also comprise a focussing objective 210 designed to focus incident radiation at the intermediate focal plane 130. The focal distance of the focussing objective 210 is f1, and its diameter is $\Phi 1$. The focussing objective may be a lens or an optical objective.

The collimating lens 110 has a first surface facing the intermediate focal plane 130, and the surface of each of the microlenses 151 is curved. Said first surface and curved surfaces can be treated with an anti-reflection deposit, the anti-reflection treatment advantageously being a layer of dielectric material, advantageously ZnS.

Particularly advantageously, the interferometers 141 in the network of two majority wave interferometers 140 can have an average coefficient of reflection R equal to between 12% and 60%, advantageously between 20% and 50%, for example equal to 42%.

During operation, the interferometric images are read on each channel of the photodetector. Corrections such as linearity, gain, or "offset" may be made.

Other corrections to the interferometric images can also be made, such as:

1/ deletion of bad pixels,
2/ deletion of pixels at the boundaries of the different channels,
3/ a shift,
4/ a cylinder (correction of geometric aberrations)
5/ vignetting (adjustment of brightness),
6/ photometric corrections Furthermore, for each equivalent pixel in the interferometric images, the interferograms can then be reconstructed, in other words a table can be filled in for each equivalent pixel with flux values as a function of the step difference imposed by the different two majority wave interferometers.

Finally, each interferogram is inverted using an inverse Fourier transform to obtain a data set that is homogeneous in terms of the number of wavelengths or wavelength, in other words to reconstruct the images cube.

As illustration of this first application the first and second sub-slides 170, 180 can include germanium. Germanium is particularly attractive for applications in the infrared field. The thermomechanical properties are also compatible with cooling of the device when it is placed in a cryostatic chamber 190.

Furthermore, the dimensions of the steps 142, the set of spacings h, the geometric characteristics of the convex diopter and the microlenses 151 can be determined by calculation techniques known to an expert in the business (for example the characteristics of the diopter and microlenses 151 can be calculated using the ZEMAX software).

The design of the first and second sub-slides 170, 180 can depend on the characteristics of the photodetector 120 and the final characteristics of the device. In this respect, as part of the first application, we present a methodology for determination of the design of the convex diopter, the steps 142 and the microlenses 151. However, this approach is not limited to this first application, and can be transposed to all embodiments described in this application.

The characteristics of the photodetector 120 can be as given in Table 1.

TABLE 1

| Title | Value (example) | Comment |
|---|---|---|
| λmin | 1.5 μm | Minimum wavelength detectable by the photodetector |
| λmax | 5.5 μm | Maximum wavelength detectable by the photodetector |
| M | 640 | Number of columns in the photodetector |
| N | 512 | Number of rows in the photodetector |
| μ | 20 | Number of columns for a channel |
| v | 20 | Number of rows for a channel |
| n | 1 | Index of medium in the cavity of two majority wave interferometers |
| tpix | 15 μm | Size of photosensitive sites in the photodetector |
| FOV | 5° | Field of view of the spectral imager |
| f2 | 20 mm | Focal length introduced by the convex diopter of the first sub-slide |
| Nouv | 3 | F number of each microlens |

The characteristics of the photodetector are used to calculate the characteristics of the device according to the invention and presented in Table 2.

TABLE 2

| Title | Comment | Equations |
|---|---|---|
| $N_{channels}$ | Number of channels in the spectral imager | $N_{voies} = \frac{M}{\mu} \times \frac{N}{v}$ |
| K | Interferogram sub-sampling factor | $K = E\left[\frac{\lambda_{min}}{\lambda_{max} - \lambda_{min}}\right]$ Where E is the "integer part" function |
| $d_e$ | Step change between two adjacent channels | $d_e = \frac{(K+1)\lambda_{min}}{4n}$ |
| dσ | Spectral resolution (expressed in cm$^{-1}$) | $d\sigma = \frac{1}{(N_{voies} - 1)(K+1)\lambda_{min}}$ |
| $e_{max}$ | Skip between the first step and the last step | $e_{max} = (N_{voies} - 1)d_e$ |

FIG. 5 illustrates the path of the rays for an optical channel. Incident radiation on the collimating lens 110 (with an angle of incidence θ relative to the optical axis of the collimating lens 110) is refracted when it reaches the first face 171 of the first sub-slide 170. The radiation emerges from the first sub-slide 170 at its second face 172 (in the air cavity 141a of an interferometer 141 with two majority waves) at the same angle θ. Part of this radiation (denoted FA on FIG. 5) is transmitted, and therefore focussed by the microlens 151 on the photodetector 120. Another part of this radiation is reflected on each of the faces 141b, 141c of the interferometer 141 with two majority waves before in turn being transmitted and focussed by the microlens 151 (radiation denoted FB on FIG. 5). Radiation FA and radiation FB interfere in the photosensitive surface 121 (these two radiations FA and FB are focussed at the same point on the photosensitive surface 121). The step difference introduced by the interferometer 141 with two majority waves between radiation FA and FB is equal to:

$$\delta = 2nh\cos(\theta) = 2nh\left(1 - \frac{\theta^2}{2}\right)$$

Where n is the index of the air cavity 141a (n=1). Thus interference rings form on the photosensitive surface 121 starting from a given angle of incidence θ. Otherwise, for a given channel, for example channel No. k, there is a step difference $\delta_k$ that corresponds majoritarily, but this step difference changes as a function of the angle of incidence θ, according to a quadratic law in θ. Thus, starting from a given angle of incidence θ, the interference rings can be too tight to be correctly sampled by the photosensitive sites. A value of $\lambda_{min}/4$ can then be imposed as the maximum tolerable step difference inside a photosensitive site. By differentiating the step difference, the result obtained is:

$$d\delta = 2he\sin(\theta)d\theta \leq \frac{\lambda_{min}}{4}$$

in which $$d\theta = \frac{t_{pix}\sqrt{2}}{f_{\mu L}}.$$

Thus, a maximum angle of incidence $\theta_{max}$ can be defined for each channel and connected to the different parameters of the device by the following relation:

$$\theta_{max} = \frac{f_{\mu L}\lambda_{min}}{8\sqrt{2}\,ne_{max}t_{pix}} = \frac{1}{2\sqrt{2}}\frac{N_{ouv}\phi_{\mu L}}{t_{pix}(N_{voies}-1)(K+1)}$$

$\Phi_{\mu L}$ being the diameter of a microlens 151, and $f_{\mu L}$ being the focal distance of said microlens 151.

Thus, the spectral resolution improves and the acceptable angular field per channel reduces with increasing values of $e_{max}$.

In practice, for configurations with low spectral resolution, the maximum tolerable angle of incidence is limited to the aperture angle of the microlenses 151. As soon as this value has been exceeded, the field imaged by a microlens 151 on the photosensitive surface 121 can be higher than the field imaged on adjacent microlenses $$151\left(\theta_{max} \leq \sin^{-1}\left(\frac{1}{2N_{ouv}}\right)\right).$$

As specified above, each channel corresponds to a microlens 151, and the detector zone allocated to each channel corresponds to the diameter of the microlens 151 (in other words $\Phi_{\mu L}=t_{pix}\,\mu$).

The previous considerations thus give details of the design of the device according to the first application.

Thus, it is still necessary to size parameters of the focussing objective 210 with focal length f1 and diameter Φ1, the field limiter with diameter ΦDF, and the first sub-slide with focal length f2 (input data) and diameter Φ2, using the relations listed in Table 3.

TABLE 3

| Title | Equations |
|---|---|
| $\Phi_{DF}$ | $\Phi_{DF} = 2f_2\tan(\theta_{max})$ |
| $\Phi_2$ | $\Phi_2 = t_{pix}\sqrt{M^2 + N^2}$ |
| $f_1$ | $f_1 = \frac{\phi_{DF}}{2\tan(FOV/2)}$ |
| $\Phi_1$ | $\phi_1 = \frac{f_1}{f_2}\phi_2$ |

A first example of a Fourier transform multichannel spectral imager 100 with high spectral resolution is presented in Tables 4 and 5. In this example, the device functions at optical wavelengths between 1.5 and 5.5 μm, with a spectral resolution of 1 cm$^{-1}$.

TABLE 4

| Title | Value (example) | Comment |
|---|---|---|
| λmin | 1.5 μm | Minimum wavelength detectable by the photodetector |
| λmax | 5.5 μm | Maximum wavelength detectable by the photodetector |
| M | 640 | Number of columns in the photodetector |
| N | 512 | Number of rows in the photodetector |
| μ | 7 | Number of columns for a channel |
| ν | 7 | Number of rows for a channel |
| n | 1 | Index of medium in the cavity of two majority wave interferometers |
| tpix | 15 μm | Size of photosensitive sites in the photodetector |
| FOV | 1° | Field of view of the spectral imager |
| f2 | 15 mm | Focal length introduced by the convex diopter of the first sub-slide |
| Nouv | 30 | F number of each microlens |

TABLE 5

| Title | Value (example) |
|---|---|
| Nchannels | 6643 |
| K | 0 |
| $d_e$ | 0.375 |
| dσ | 1 cm$^{-1}$ |
| No of useful bands | 4831 |
| $e_{max}$ | 2490.75 μm |
| $\theta_{max}$ | 0.011 rad |
| $\Phi_{\mu L}$ | 105 μm |
| $f_{\mu L}$ | 3150 μm |
| Circle of diffusion | 105 μm |
| Number of resolved points | 1 |
| Field depth | 3150 μm |
| $\Phi_{DF}$ | 0.335 mm |
| $\Phi_2$ | 12.3 mm |
| $f_1$ | 19.2 mm |
| $\Phi_1$ | 15.75 mm |

A second example of a Fourier transform multichannel spectral imager 100 with low spectral resolution is presented in Tables 6 and 7.

In this example, the device functions at optical wavelengths between 1.5 and 5.5 μm.

TABLE 6

| Title | Value (example) | Comment |
|---|---|---|
| λmin | 1.5 μm | Minimum wavelength detectable by the photodetector |
| λmax | 5.5 μm | Maximum wavelength detectable by the photodetector |
| M | 1024 | Number of columns in the photodetector |
| N | 768 | Number of rows in the photodetector |
| μ | 100 | Number of columns for a channel |
| ν | 100 | Number of rows for a channel |
| n | 1 | Index of medium in the cavity of two majority wave interferometers |
| tpix | 10 μm | Size of photosensitive sites in the photodetector |
| FOV | 30° | Field of view of the spectral imager |
| f2 | 15 mm | Focal length introduced by the convex diopter of the first sub-slide |
| Nouv | 4 | F number of each microlens |

TABLE 7

| Title | Value (example) |
|---|---|
| Nchannels | 70 |
| K | 0 |
| $d_e$ | 0.375 |
| dσ | 96.62 cm$^{-1}$ |
| No of useful bands | 50 |
| $e_{max}$ | 25.875 μm |
| $e_{max}$ | 0.125 rad |
| $\Phi_{\mu L}$ | 1000 μm |
| $f_{\mu L}$ | 4000 μm |
| Circle of diffusion | 14 μm |
| Number of resolved points | 5102 |
| Field depth | 56 μm |
| $\Phi_{DF}$ | 3.780 mm |
| $\Phi_2$ | 12.8 mm |
| $f_1$ | 7.1 mm |
| $\Phi_1$ | 6.02 mm |

This invention has been described for a particular arrangement of the network of two majority wave interferometers 140 and the microlenses network 150. However, the invention is not limited to this arrangement. A spectral imager for which the order between the micro-lenses network and the network of two majority wave interferometers is inverted from the above description (it should be understood that the interferometers network 140 is located between the photosensitive surface and the micro-lenses network) can easily be envisaged within the framework of this invention.

Advantageously, the spectral imager according to this invention can be used for detection and/or quantification of gases and/or aerosols, and particularly carbon dioxide, water or methane. The measurement principle is based on the technique described by Fortunato [3].

Also advantageously, a spectral imager 100 can be used in a mobile electronic device, for example a mobile telephone or a tablet or a drone.

REFERENCES

[1] Rui Shogenji et al., "Multispectral imaging using compact compound optics", Optics Express, 12, 8, 1643-1655, (2004).
[2] Principles of Optics, Max Born & Emil Wolf, Pergamon Press, Sixth Edition, 1980, section VII ("Elements of the theory of interferences and interferometers").
[3] G. Fortunato, "Application de la corrélation interférentielle de spectres à la détection de polluants atmosphériques," (Application of the interference correlation of spectra to detection of atmospheric pollutants") J. Opt. 9, 281 (1978).

The invention claimed is:

1. A fourier transform multichannel spectral imager, comprising:
   a photodetector comprising a plurality of photosensitive sites flush with a photosensitive surface of the photodetector;
   a network of two majority wave interferometers, each having a fineness between 2 and 10 and comprising a cavity delimited by two faces facing each other and parallel to the photosensitive surface, the two faces of each interferometer being at a different spacing from one interferometer to the next, the interferometers of the interferometers network being arranged in a plane parallel to the photosensitive surface;
   a network of microlenses formed in a plane parallel to the photosensitive surface;
   each microlens in the network of microlenses being paired with an interferometer in the network of two majority wave interferometers to form an optical pair, the optical pair comprising a focal image plane coincident with the photosensitive surface, the pair facing a section of the photosensitive surface.

2. A spectral imager according to claim 1, further comprising a signal separation network, each signal separator being paired with an optical pair and configured such that an image formed by each optical pair at the photosensitive surface is limited to a section of the photosensitive surface facing which the optical pair is positioned.

3. A spectral imager according to claim 2, wherein each signal separator comprises first side walls perpendicular to the photosensitive surface, and in contact with the photosensitive surface.

4. A spectral imager according to claim 2, wherein each signal separator comprises second side walls, each of the second side walls optically isolating two adjacent two majority wave interferometers.

5. A spectral imager according to claim 1, comprising a first sub-slide, the first sub-slide comprises a first face and a second face parallel to the first face, the second face being parallel to and facing a first face of a second sub-slide, the second sub-slide comprising a second face on which the network of microlenses is located;
   and further comprising steps formed on one of the two faces chosen from among the second face of the first sub-slide and the first face of the second sub-slide, the other of the two faces being a plane diopter, the steps formed on one of the two faces form the network of two majority wave interferometers with the plane diopter, each step being formed at a different depth from other steps, and being vertically in line with a microlens along a direction perpendicular to the photosensitive surface.

6. A spectral imager according to claim 5, wherein shape of the steps is square or rectangular or hexagonal.

7. A spectral imager according to claim 6, wherein the second face of the first sub-slide has a reflection factor equal to between 5% and 90%.

8. A spectral imager according to claim 6, wherein the first face of the second sub-slide has a reflection factor equal to between 5% and 90%.

9. A spectral imager according to claim 1, wherein the interferometers in the network of two majority wave interferometers are distributed in a two-dimensional matrix, on a square two-dimensional square matrix.

10. A spectral imager according to claim 1, wherein the photodetector, the network of two majority wave interferometers, and the microlenses network are all located in a cryostatic chamber, and the cryostatic chamber comprises an aperture.

11. A spectral imager according to claim 1, wherein each of the microlenses has a curved surface, the curved surfaces including an anti-reflection deposit, the anti-reflection treatment being a layer of dielectric material.

12. A spectral imager according to claim 1, wherein the interferometers in the network of two majority wave interferometers have an average coefficient of reflection equal to between 12% and 60%.

13. A mobile electronic device comprising a spectral imager according to claim 1, the mobile electronic device being a smartphone or a tablet or a drone.

* * * * *